April 16, 1940.  R. TOPPING  2,197,280
SUPPLEMENTAL VIEW DEVICE
Filed Sept. 19, 1938
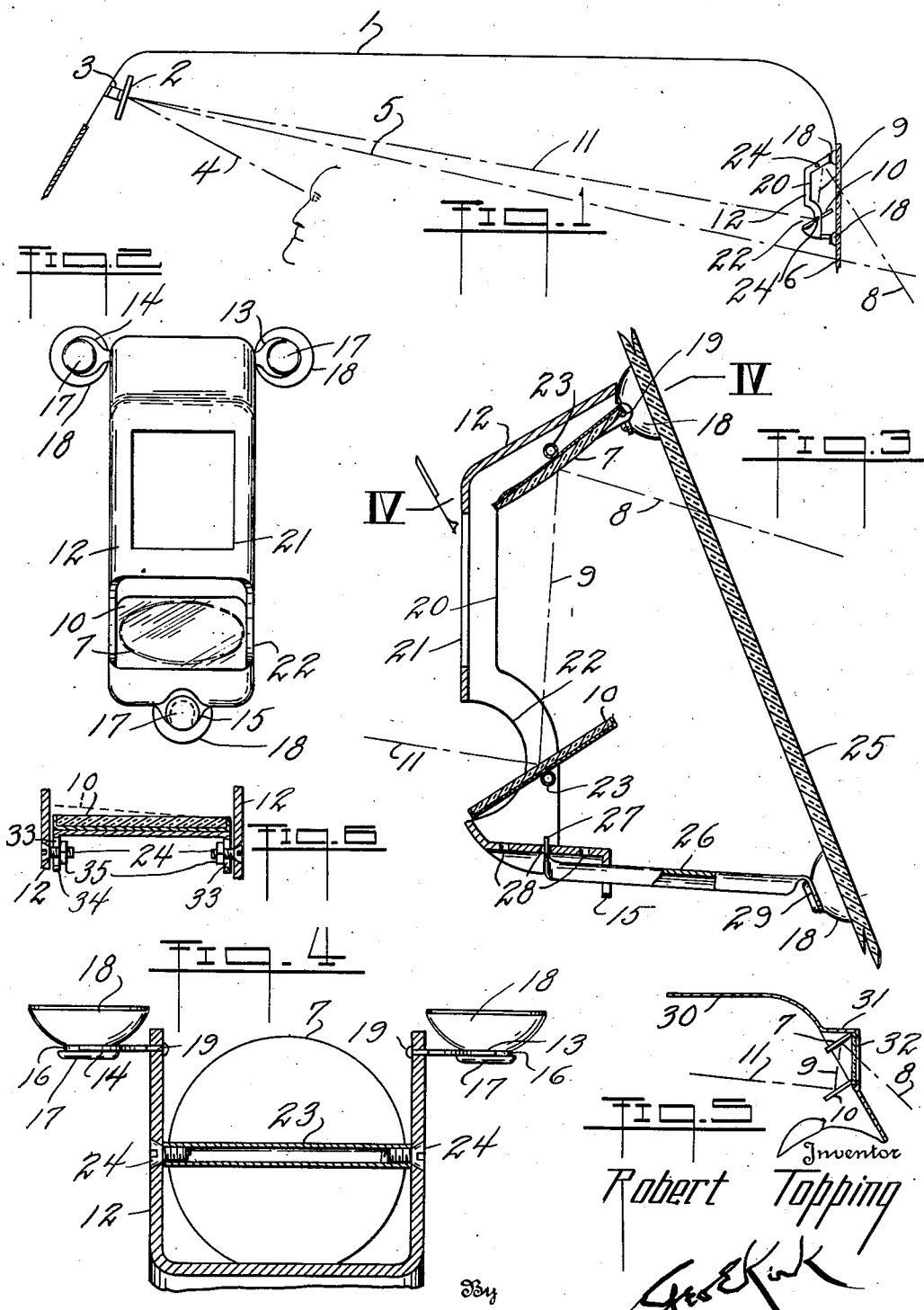

Patented Apr. 16, 1940

2,197,280

UNITED STATES PATENT OFFICE 2,197,280

SUPPLEMENTAL VIEW DEVICE

Robert Topping, Toledo, Ohio

Application September 19, 1938, Serial No. 230,630

1 Claim. (Cl. 88—86)

This invention relates to extending the vision range for an occupant of a vehicle especially into lateral proximity.

This invention has utility when incorporated as a reflector system or supplemental to rear view mirrors, to be helpful for backing, close parking, and also to disclose whether there be unwanted passengers in the vicinity of the rear bumper.

Referring to the drawing:

Fig. 1 is a side view, with parts broken away, showing an embodiment of the invention in a closed type of passenger automobile;

Fig. 2 is a view of the device from the side toward the rear view mirror in Fig. 1, showing details of this bracket mounting scheme;

Fig. 3 is a medial vertical section through the device of Fig. 2, showing the bracket and its adjusted mounting on an inclined rear window for a closed body motor vehicle;

Fig. 4 is a section on the line IV—IV, Fig. 3, showing the mounting of the bracket and of the convex or ray-gathering mirror in the bracket;

Fig. 5 is a view of the reflector system as built in a motor vehicle body; and

Fig. 6 is a detail view showing an alternative reflector mounting of wider range adjustments.

Motor vehicle closed body 1 is shown as having rear view reflector or mirror 2 with adjustable mounting 3 fixing such reflector with the car body of the vehicle. In practice, line of vision 4 from the driver or passenger in the vehicle to rear view mirror 2 has line 5 therefrom through rear window 6 fixed with the vehicle body. Such range of vision as determined by lines 5 from the rear view mirror have considerable clearance from the range of the rear bumper, spare tire, and taillight. There is accordingly full occasion for the driver to be concerned as to whether there may be children stealing rides on the rear of the car, whether there be sufficient clearance for parking or getting into or out of a garage.

Under the invention herein, ray gathering mirror or reflector 7 reflects such received rays 8 to line 9 against plano reflector 10 and such are there effective by way of lines 11 to supplement the rays or lines 5 in reaching the rear view mirror 2 and thereby being within the observance range for passenger or driver of the vehicle having observance lines 4 to the mirror 2. The location and dimension of the device herein is one to detract as a minimum from the normal rear view effectiveness of the mirror 2 as to objects remote from the rear of the car or vehicle. The device herein embodies bracket 12 having crescent forks 13, 14, 15, therefrom adapted to enter reduced portions 16 back of collars 17 in anchoring suction cups 18. These brackets 13, 14, have swivel mountings 19. The bracket 12 is of rigid form and has open work sides 20 between the mirrors or reflectors 7, 10, and open work front 21 and open work front and side 22 adjacent the plano or flat mirror or reflector 10. The mirrors 7, 10 each has fixed across the back thereof tube 23. Screws 24 serve to clamp these tubes 23 into the desired angular position for the respective reflectors which are held thereby in parallel axis relationship.

In the instance of the rear window 6 approximating vertical, suction cup 18 may be directly in the crescent fork 15. However, in the instance that there is a range of inclination for rear view as window 25 (Fig. 3), straight adjustable leg or extension 26 is adopted, which is of arch form terminating in tang 27 at one end, which may be inserted into a port 28 in the bracket 12 and arc portion of the leg extend through the fork 15 to terminal fork 29 wherein the suction cup 18 may yieldably take the direction for the proper setting against the inclined rear window 25.

Instead of this accessory as a bracket device, car body 30 may have boss 31 located thereon with transparent downward portions 32 therefrom, thereby permitting location of reflectors 7, 10, in cooperative relation therewith.

In the operation of the device herein, the accessory or equipment is located, as herein shown, in a closed body adjacent the rear window or port region. The open work between the reflectors leaves ample illumination and avoids darkening interference or intercepting of desirable vision range of the one observing or looking into the rear view mirror. However, as such a one localizes the view into the reflector 10 the gathered or reduced dimension in view lines accumulated in the reflector 7 bring into the range of vision for observation the general range fully across the rear of the car from bumper termini and in proximity therefrom rearwardly and in between toward the car.

In instances wherein unusual reflector angle conditions are encountered, the reflectors may be mounted (Fig. 6) for lateral as well as horizontal adjustment. To this end, the screws 24 may extend through slots 33 in U-member 34 to be engaged by clamping nuts 35. This permits a lateral tilting of a reflector as to the frame 12 in addition to the angle of adjustment as to the horizontal. This wider range adjustment may be used on either reflector and thus care for unusual angular adjustments such as encountered in angular offset rear view openings.

What is claimed and it is desired to secure by Letters Patent is:

A view device embodying a body section, a pair of suction cups having aligned rockable connection providing mounting means anchoring the section for tilting in one direction only, a pair of reflectors having parallel pivotal axes fixed with the section, and a telescopically adjustable leg having a suction cup terminus spaced from the pair of suction cups in providing additional mounting means for the section and as adjustable determining the tilt position of the section on the rockable mounting means in thereby completing anchoring of the device for the independent adjustment of the reflectors as to the mounting means in periscope set up therefor.

ROBERT TOPPING.